United States Patent [19]
Alberti et al.

[11] Patent Number: 5,699,840
[45] Date of Patent: Dec. 23, 1997

[54] RETENTION SYSTEM AND METHOD FOR PREVENTING THE EFFLUX OF SUBSTANCES FROM INSTALLATIONS INTO THE SURROUNDINGS

[75] Inventors: Klaus Alberti, Idstein; Eberhard Ritter, deceased, late of Marburg, by Rosemarie Ritter-Horn, neé Horn, heiress; Frank Westphal; Guido Wehmeier, both of Frankfurt am Main, all of Germany

[73] Assignee: Hoechst Aktiengesellschaft

[21] Appl. No.: 662,952

[22] Filed: Jun. 13, 1996

Related U.S. Application Data

[63] Continuation of Ser. No. 287,842, Aug. 9, 1994.

[30] Foreign Application Priority Data

Aug. 11, 1993 [DE] Germany .................. 43 26 888.9

[51] Int. Cl.⁶ .......................... B65D 90/24; B08B 15/00
[52] U.S. Cl. .................. 141/313; 141/67; 141/114; 137/571
[58] Field of Search .................. 141/10, 67, 114, 141/313, 314, 317; 137/571, 572

[56] References Cited

U.S. PATENT DOCUMENTS

| | | |
|---|---|---|
| 3,276,620 | 10/1966 | Dorfman. |
| 3,664,072 | 5/1972 | Lieckfeld. |
| 3,675,942 | 7/1972 | Huber .................. 141/10 X |
| 4,050,483 | 9/1977 | Bishop .................. 141/10 X |
| 4,996,848 | 3/1991 | Nelson et al. ............ 141/10 X |
| 5,018,551 | 5/1991 | Pelissier .................. 137/571 |
| 5,058,631 | 10/1991 | Grant .................. 141/10 |
| 5,110,639 | 5/1992 | Akao .................. 383/109 X |
| 5,176,187 | 1/1993 | Grant .................. 141/10 |
| 5,255,722 | 10/1993 | Furstenberg .................. 141/114 |
| 5,359,863 | 11/1994 | Lewis .................. 62/149 |
| 5,368,067 | 11/1994 | Cook, Jr. .................. 141/114 |

FOREIGN PATENT DOCUMENTS

| | | |
|---|---|---|
| 898914 | 5/1984 | Belgium. |
| 460981 | 6/1928 | Germany. |
| 40 15 354A1 | 11/1991 | Germany. |

*Primary Examiner*—J. Casimer Jacyna
*Attorney, Agent, or Firm*—Connolly & Hutz

[57] ABSTRACT

A retention system is described for collecting substances from installations. This includes at least one outlet line which opens into at least one flexible container which is joined in am essentially pressure-tight manner. The container is attached to a pressure relief valve and serves as a pressure relief safety device for conducting away substances from the installation. The flexible container must be dimensioned at least so that in the filled state it has an internal volume such that the internal pressure of the joint system of outlet line and flexible container virtually corresponds to the external pressure.

5 Claims, 1 Drawing Sheet

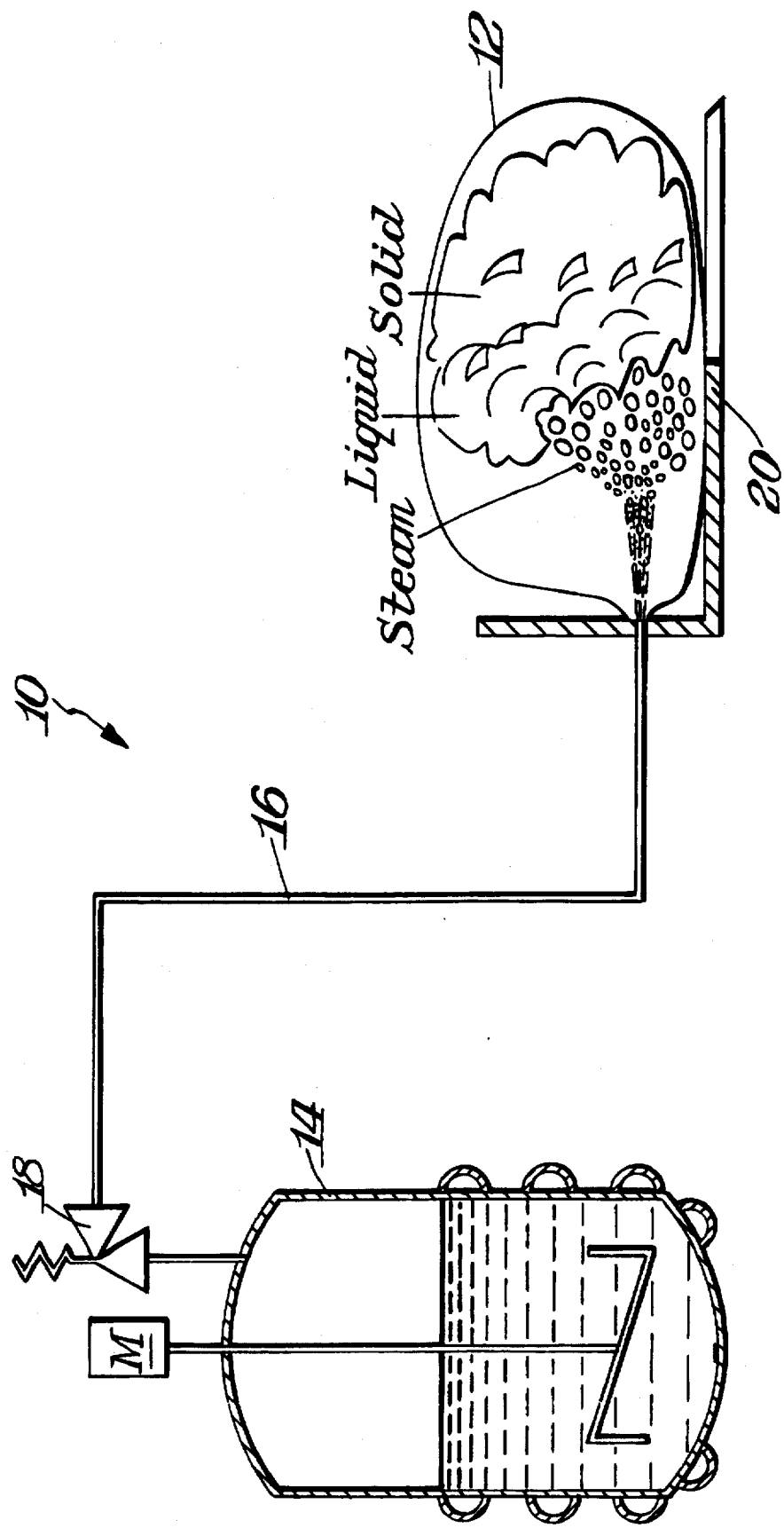

RETENTION SYSTEM AND METHOD FOR PREVENTING THE EFFLUX OF SUBSTANCES FROM INSTALLATIONS INTO THE SURROUNDINGS

This application is a continuation of application Ser. No. 08/287,842 filed on Aug. 9, 1994.

BACKGROUND OF THE INVENTION

Retention system and method for preventing the efflux of substances from installations into the surroundings The present invention relates to the use of flexible containers in safety systems for collecting substances from installations, and to a method for preventing the efflux of substances from installations into the surroundings.

In the operation of installations in which, as a result of faults, uncontrolled chemical reactions or excessive heat development proceed, an undesired increase of the internal pressure can occur. As a consequence of such faults, undesired efflux of substances into the surroundings can occur.

In the case of such installations, it is generally conventional to provide pressure-relief devices or overflow devices. Examples of these are discharge devices which are equipped with safety valves or rupture disks. Disadvantages in the case of free efflux of substances are, in particular, possible danger to people and the surroundings. In addition, disposal of the substances which have escaped can be very time consuming and/or costly.

It is already known to provide such discharge devices with receiving vessels, some of which are designed to be pressure resistant. In the known safety systems, rigid collection vessels are conventionally used. A disadvantage of these vessels is, in particular, their high space requirement. This makes it difficult to retrofit existing installations with such apparatuses.

A further disadvantage of known rigid receiving vessels is their high weight. This makes it difficult or in some cases impossible to retrofit existing installations, since erection on roofs of buildings is frequently impossible for reasons of statics.

It has also already been attempted to use flexible receiving vessels. A disadvantage of these previously known receiving vessels is that, in the event of an accident, these must first be made ready for operation by preparatory measures, such as by rolling out, unfolding or connection. These vessels also only serve for collecting substances which leak unpressurized from damaged installations. Such vessels are described, for example, in U.S. Pat. No. 4,622,027.

There is, moreover, a requirement for an improvement of the safety systems of installations in which substances can unintentionally escape into the surroundings. In particular, there is a requirement for safety systems with which existing installations can be retrofitted in a simple manner and which are applied without further preparations in the event of an accident.

SUMMARY OF THE INVENTION

The present invention relates to a retention system for collecting substances from installations, comprising at least one outlet line which opens out into a flexible container and is joined to this in an essentially pressure-tight manner and which is equipped with a pressure-relief safety device, the flexible container being dimensioned at least so that in the filled state it has an internal volume such that the internal pressure of the joint system of outlet line and flexible container virtually corresponds to the external pressure.

The installation to be equipped with the flexible containers can be entire plant complexes or plant components in which, as a result of faults in process runs, a pressure can build up within the plant which exceeds a preset threshold level and which can lead to an undesirable efflux of substances, such as gases and/or liquids and/or solids into the surroundings. These process runs are normally performed unpressurized or at superatmospheric pressure or under vacuum. The process runs can be chemical reactions; however, they can also be other operations unconnected with chemical reactions, such as separation operations, such as rectifications, or purification operations, such as scrubbing, in the course of which an undesirable pressure build-up can result, or they can be the storage of substances in silos in which a high static pressure can build up.

BRIEF DESCRIPTION OF THE DRAWING

The single Figure of drawing is a diagrammatical side elevational view in cross-section of a retention system, according to the present invention.

DETAILED DESCRIPTION OF THE INVENTION

As shown in the drawing, a retention system 10 comprises a flexible container 12 connected to a reaction vessel 14 by a conduit 16. The reaction vessel has a pressure relief valve 18 and the conduit is connected to the downstream end of that valve. Support structure 20 is provided for flexible container 16.

In particular, the installations are reactors, such as reaction vessels or flow reactors, in which chemical reactions are carried out, or columns, transport devices, storage tanks or other pressurized installations or apparatuses.

The substances to be conducted away from the installation are conventionally mixtures of condensible and/or noncondensible gases and liquids which can escape from these installations in the event of a possible accident. The substances can also contain solids or escape as vapors.

The outlet line is an apparatus, conventional per se, which is provided for pressure relief and for outflow of substances from the installation. This outlet line is equipped with a pressure-relief safety device, conventional per se, such as a safety valve or a rupture disk.

The outlet line opening out into the flexible container is essentially pressure-tightly joined to this. This is taken to mean a joint which withstands the pressures occurring in the system, which includes installation, outlet line and container, in particular the pressures which can occur at the joint in the event of an accident. The joint is a structural apparatus by which the flexible container can be mounted on the outlet line securely and free from slipping off. The geometry of the outlet line need not be specially modified for the flexible container. The joint is, for example, a flanged joint. In the container, the outlet line can be fabricated in the form of baffles or sieve/atomizer devices, in order to avoid point loads.

The flexible container used according to the invention must be dimensioned at least so that the internal volume of the flexible container completely absorbs the amount of substance which has escaped, without a significant internal pressure building up.

Nevertheless, the containers are designed in such a way that they can also withstand at least a slight superatmospheric pressure.

A precondition of the joint system of outlet line and flexible container is that the internal pressure in the system after a possible accident virtually corresponds to the external pressure. This is taken to mean that the internal pressure is not significantly above the external pressure, for example is up to 1 to 3 bar, preferably up to 1 to 2 bar, above this, or corresponds to the external pressure.

Still other apparatuses can expediently be connected between the outlet line and the flexible container, such as apparatuses for separating off liquids and/or solids or for condensing out vapors.

The flexible container can be composed of any material and have any internal volume as long as this has the ability to withstand the pressures occurring in the system and to be resistant to the substances to be collected.

The flexible container is preferably composed of a coated or uncoated fabric.

The flexible container preferably has a volume of 0.1 to 1000 m$^3$ and contains, in particular, high-strength fabric. If the volume of one container alone is insufficient, a plurality of containers can also be connected together, for example by hoses and/or pipes with or without pressure-relief safety devices, such as rupture disks which preferably have low response pressures, for example about 0.5 bar.

The high-strength fabric can be a material based on natural fibers or, in particular, synthetic fibers. Examples of these are fibers made of polycondensates, such as polyamides, in particular aromatic polyamides, polyesters, in particular polyethylene terephthalate or copolyesters thereof, or polyureas; fibers made of polymers, such as polyethylene, polypropylene, polyvinyl chloride, polyfluoroethylene, polyacrylonitrile; fibers made of polyadducts, such as polyurethane; or fibers made of inorganic raw materials, such as glass fibers, metal fibers or carbon fibers.

In addition, the fabric can be composite fabric made of the fiber materials mentioned.

The fabrics have a low gas and liquid permeability—sufficient for the envisaged application—and can be joined together by sewing or welding.

The fabrics, moreover, can be coated on one or both sides to improve the resistance to environmental influences or operationally-caused stresses, such as resistance to chemicals, light and UV, resistance to heat, cold and tearing, or to improve the processibility.

Preferred coating compositions serve to improve the impermeability and/or the temperature resistance and resistance to chemicals of the flexible container for the substances to be received; these are preferably thermoplastic materials, such as PVC, in particular plasticized PVC or polyurethane, or polyolefins, such as the product $^R$PERL of the Van Besouw company; or elastomers, in particular synthetic or natural rubber, isoprene, neoprene or silicone.

The flexible container is selected so that it can be used in a broad temperature range, for example at temperatures from −40° to +300° C. preferably in the temperature range from −30° to +200° C.

The flexible container can have any shapes adapted to the particular application.

The flexible container is preferably cubold or cylindrical in the filled state and is produced from fabric webs which are joined together by welding or sewing.

The cylindrical part of the flexible container is very particularly preferably fabricated from fabric webs which run spirally and are joined together by welding, sewing, gluing or vulcanizing. This embodiment is described, for example, in DE-A-1,921,512 and has as a feature the fact that the joints of the fabric webs in the filled state are exposed to virtually no tensile forces.

The flexible container, apart from the joint to the outlet line, can have other fittings, such as one or more valves, for example take-off valves, overpressure valves, gas-venting valves or feed valves.

In addition, the flexible container can be provided with aids for its handling, for example loops and/or rings on the side on which the inlet port is situated, by which the container can be fixed to a holder.

In addition, at the orifice of at least one outer side of the flexible container, guide elements can be mounted which control the volume change of the flexible container when it is filled, and also serve as apparatuses and/or holders to permit fixing to building surfaces in a strong wind.

The flexible container can be connected downstream of the outlet line in any form. This container is preferably connected downstream in a space-saving manner in a folded or rolled-up state. However, the container can alternatively be present in a spread-out form.

The manner of the folding is of importance for the rapidity of the self-induced unfolding.

Particularly good results are achieved with a method of folding in which virtually all pleats occur at the top side of the container and in which the bottom side lying on the ground is virtually pleat-free.

Further particularly good results are achieved if the flexible container is provided in the form of a roll, with or without folded-in ends.

The flexible container is preferably provided in a combination of folding and rolling up, in which case, with the container laid out flat, the end walls are first folded in and the container is then rolled up in the direction towards the outlet line.

It has been shown that the flexible container can fill extremely rapidly and that virtually the entire volume is available to receive the solid, liquid and/or gaseous substances escaping.

A small dead space resulting on folding or rolling up can be filled with inert gases. Chemicals for stopping chemical reactions or for neutralizing the pH can be introduced into the flexible container; in addition, substances having high heat capacity, for example water, can be introduced in order to condense out condensible portions rapidly.

An embodiment of the retention system according to the invention is very particularly preferred in which the walls of the flexible container are treated with a slip additive and/or lubricant; these are preferably compositions which facilitate the unfolding of the container at the high temperatures occurring during the filling of the container.

The slip additives and/or lubricants used are preferably those compositions which are functional at elevated temperatures, for example molybdenum disulfide, mica, graphite or, in particular, talcum; or silicone oils or silicone greases.

In a further preferred embodiment of the invention, at the orifice of the outlet line into the flexible container and/or in the flexible container there is mounted at least one apparatus for distributing mass streams, in particular liquids.

The outlet line preferably has a funnel-shaped orifice which distributes the exiting mass stream as far as possible in such a way that no jet is formed which is highly concentrated onto one point. A further preferred form of the orifice can also break up the jet in such a manner that the unfolding or unrolling is specifically promoted.

The flexible container or containers are preferably placed on roofs of buildings, since the weight loading does not occur at one point, but is distributed evenly over the entire support surface. A plurality of installations can be united in one appropriately dimensioned flexible container. Equally, a plurality of flexible containers can also be connected together.

The safety system according to the invention can be used without further preparations in the event of an accident.

The invention therefore also relates to a method for avoiding the efflux of substances from installations into the surroundings, comprising the steps:

a) conducting away the substances from the installation by means of at least one outlet line which serves for pressure relief and for conducting away substances from the installation, b) introducing the substances into at least one flexible container which is joined to the outlet line, the flexible container being selected so that in the filled state it has an internal volume which is at least such that the internal pressure of the joint system of outlet line and flexible container virtually corresponds to the external pressure, and c) intermediate storage of the substances in said flexible container up to proper disposal.

When a response pressure of a pressure-relief device is achieved, the material escaping from the installation, for example a reaction vessel, flows through the outlet line into the flexible container or containers, which, as a result, unfolds in a self-induced manner and collects the outflowing substances. The condensible portion condenses out in the course of this. The container including the contents can then be disposed of correctly.

The following example describes the invention without restricting it.

An autoclave having an internal volume of 105 liters and filled with 88.2 liters of water is heated to 180° C. up to an internal pressure of 10 bar. The autoclave is connected via an outlet line, equipped with a safety valve, to a flexible container made of PVC-coated fabric of ®TREVIRA HOCHFEST. The flexible container has an internal volume of 20 m³. The safety valve is designed for a pressure of up to 10 bar. After the response pressure is achieved, the autoclave contents are blown down via the outlet line into the flexible container, the container unfolding in a self-induced manner. The course of the pressure let-down and of the water temperature in the joint system of autoclave, outlet line and container (measured in the autoclave) is shown in the following table:

TABLE

| Let-down time (sec.): | 2 | 4 | 6 | 8 | 10 | 14 | 18 | 22 | 26 |
|---|---|---|---|---|---|---|---|---|---|
| Pressure in the system (bar): | 9 | 7.5 | 6 | 5.2 | 4.2 | 3 | 2.5 | 1.8 | 1.1 |
| Water temperature (°C.): | 178 | 175 | 170 | 160 | 150 | 140 | 120 | 115 | 110 |
| Temperature in the flexible container (°C.) | 100 | 100 | 100 | 100 | 100 | 100 | 100 | 100 | 100 |

We claim:

1. A safety retention system comprising a reaction vessel in which chemical reactions are carried out and which contains various substances, the vessel having at least one outlet, a pressure-relief safety device connected to the outlet constructed and arranged to open the outlet to relieve unexpected pressure or a blow out in the reaction vessel, at least one flexible container for receiving unexpected pressure buildup and various substances from the reaction vessel when the pressure-relief safety device opens the outlet of the reaction vessel, an outlet line extending between the pressure-relief safety device and the at least one flexible container, and wherein the at least one flexible container is composed of high strength fabric and the at least one flexible container has a volume dimensioned to receive escaping substances from the reaction vessel via the pressure-relief safety device and the outlet line whereby an internal pressure buildup in the at least one flexible container is no more than 3 bars above external pressure.

2. A safety retention system as in claim 1 wherein the at least one flexible container is composed of coated high strength fabric and is cylindrical in a filled state.

3. A safety retention system as in claim 2 wherein the walls of the at least one flexible container are treated with a lubricant.

4. A safety retention system as in claim 3 wherein the lubricant is talcum.

5. A safety retention system as in claim 1 wherein the at least one flexible container has a folded-up form before receiving various substances from the vessel.

* * * * *